Sheet 1-2 Sheets.

J. Russell,
Turning Irregular Forms,

Nº 7,879.          Patented Jan. 1, 1851.

Sheet 2 - 2 Sheets.
J. Russell
Turning Irregular Forms,
N° 7,879.
Patented Jan. 1, 1851.
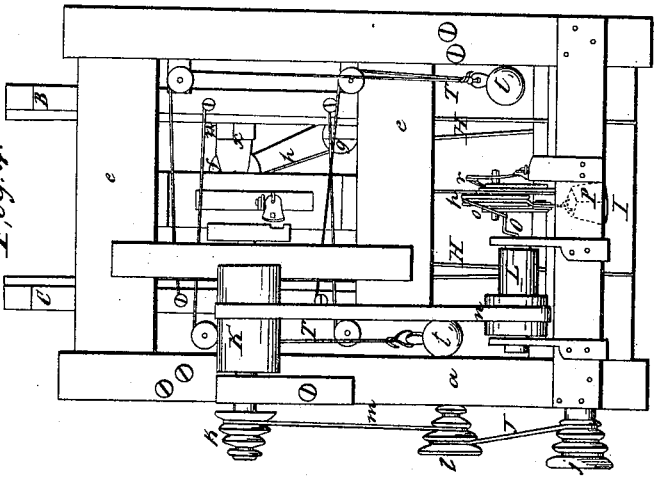
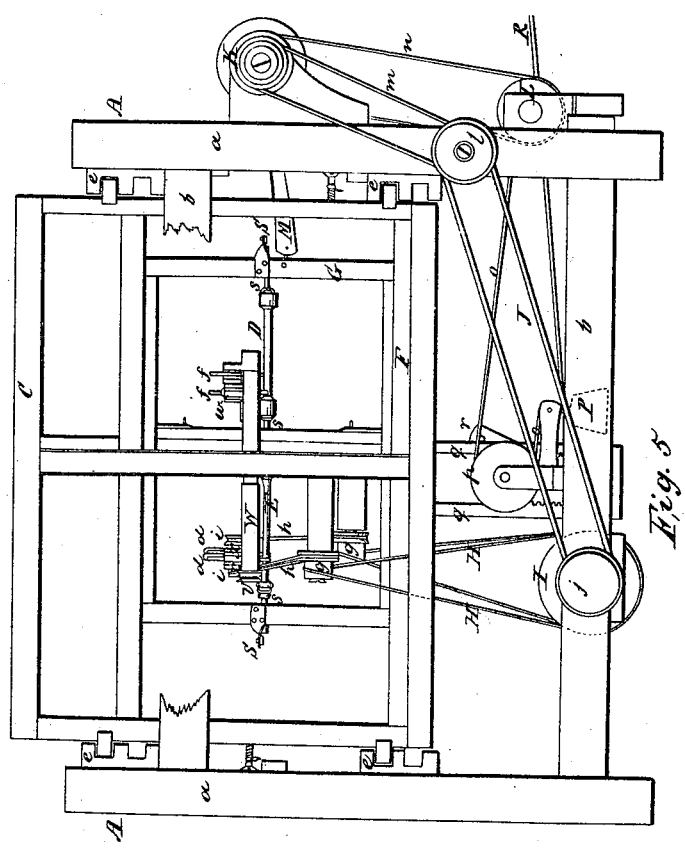
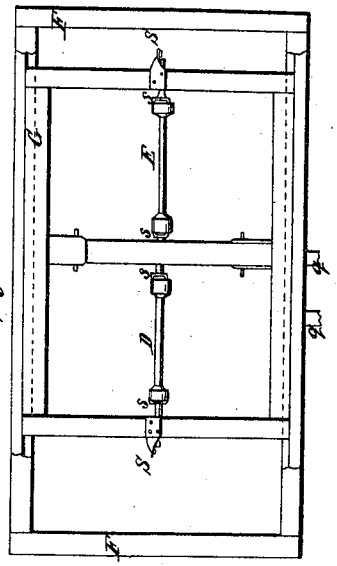

UNITED STATES PATENT OFFICE.

JONATHAN RUSSELL, OF PHILADELPHIA, PENNSYLVANIA.

MACHINE FOR TURNING IRREGULAR FORMS.

Specification of Letters Patent No. 7,879, dated January 1, 1851.

*To all whom it may concern:*

Be it known that I, JONATHAN RUSSELL, of the city and county of Philadelphia and State of Pennsylvania, have invented a new and useful Machine for Irregular Cutting; and I hereby declare that the following is a full, clear, and exact description of the construction and operation of the same, reference being had to the annexed drawings, making part of this specification, in which—

Figure 1:
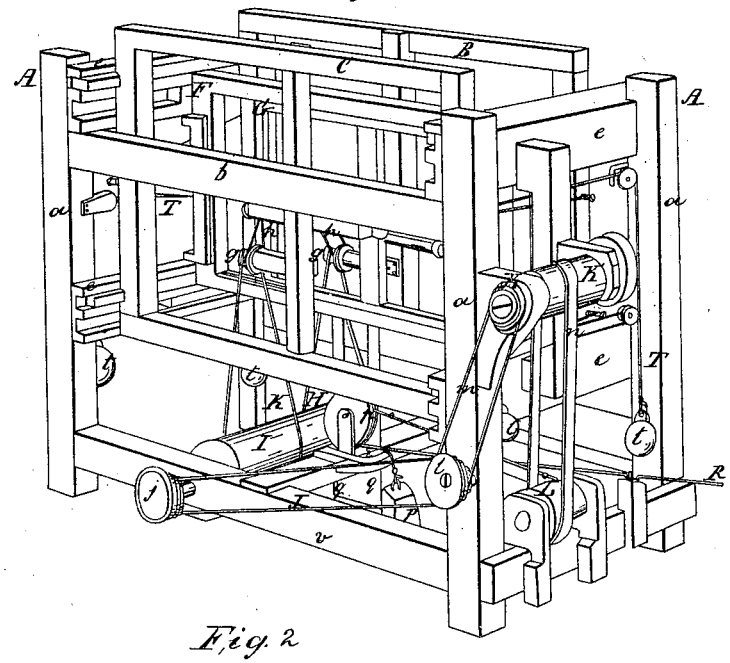
Figure 2:
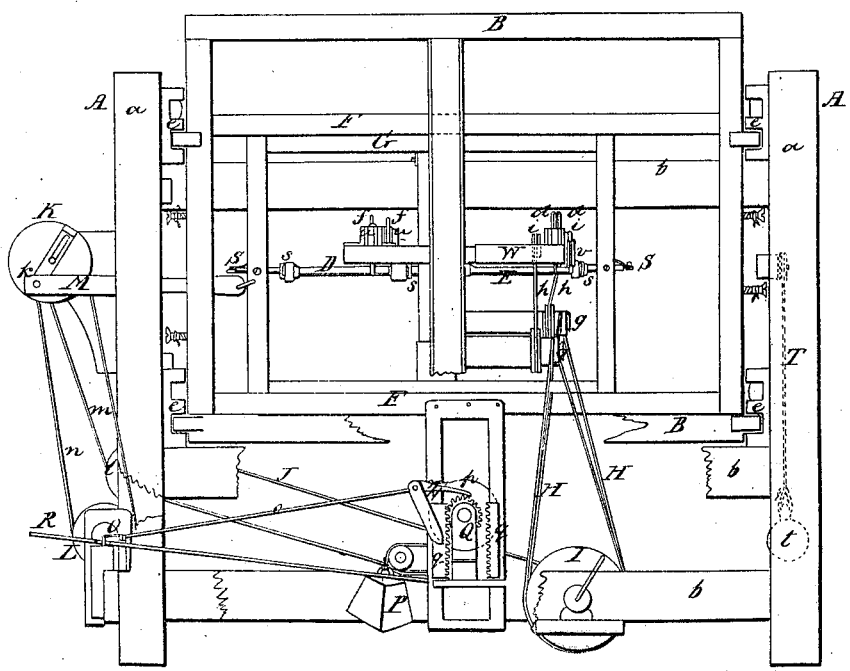

Sheet 1, Figure 1, is a perspective view, Fig. 2, a front elevation view. Sheet 2, Fig. 3, a back elevation view, Fig. 4, an end view, Fig. 5 a front view of carriages F and G, Figs. 6 and 7 a sectional detached view of the screw $w$, and slide W.

The same letters are used for corresponding parts in the different views.

The nature of my improvement consists in cutting spokes, &c., &c., or any other irregular forms to pattern, while the pattern and rough material are held fast and do not revolve. The pattern and rough material are both held fast in a carriage or carriages placed in the same line or one above the other, which have a right and left longitudinal motion, and an up and down motion along and by the cutting tools and tracers, or friction points. There are two carriages which have a lateral motion toward and from each other, in or on these two carriages are placed the tracers and the cutting tools. The tools and tracers work against and over the pattern and rough material, while the pattern and the rough material move to the right and left, along and by the cutting tools, and the tracers and up and down after they have reached the end of the pattern and rough material or vice versa, the friction points following the shape of the pattern so that the rough material may be cut like the pattern. The tracers are made to set out, or in, so that the rough material may be cut larger or smaller on one or both sides, than the pattern. This is particularly advantageous in cutting shoe lasts enabling me to add to, or take from either side of the last, without adding to or taking from both sides, and without changing the pattern, thus producing a result not found in any machine for a like purpose.

To enable others skilled in the art, to make and use my machine I will proceed to describe its operation.

I make my machine with four posts, side and end rails, out of iron, wood, or any suitable substance. The machine is made about four feet long, three feet high, and about four feet wide, or in size varying to suit the work or purpose. A the main frame described in Fig. 1. $a, a, a, a$, the four posts; $b, b, b, b$, the four side rails; $e, e, e, e$, the four end rails; which have grooves in them in which move the slides on the ends of the two carriages B, and C, that the said carriages may have a lateral motion toward and from each other. In or on carriages B and C, are placed the cutting tools $d, d$, and the friction points or tracers $f, f$. The cutting tools, and the tracers, move toward and against the pattern D, and the rough material E. F, is the carriage which moves up and down on the inner ends of the main frame A. G, G, the carriages that move in or on the carriage F. The pattern and rough material are fastened in or on the carriages G, G. The pattern and the rough material, move to the right and left while cutting and alternately up and down after the cutter has run the length of the rough block, cutting on both sides by sections, at the same time, while passing and repassing the cutting tools and the tracers or vice versa. H, H, the bands which pass over the large drum I, and then go to and over the pulleys $g, g, h, h$, the bands that go over the pulleys $g, g$, to and over the pulleys $i, i$, to drive the cutting tools. J a band that goes over a small pulley $j$, on one end of the large drum I, and then goes to and over pulley $l$. Band $m$, goes over pulley $l$, and then goes to and over pulley K.

On one end of K, is the crank $k$, M is the pitman; one end of the pitman is on crank $k$, the other end of the pitman is fastened to one of the carriages G, to give said carriages G, G, (and which are represented in the drawing as fastened together by clamps) a right and left motion; this motion may be given by rack and pinion or any other power. Band $n$, passes over one part of K′, goes to and over pulley L.

On one end of pulley L, is an eccentric shaft O, to which a cord $o$, is fastened; the cord $o$, then passes to and over a wheel $p$, on one end of the cord $o$, is a weight P, which gives the racks $q, q$, and pinion Q, their motion. One end of the racks is fastened on the lower part of carriage F, to give carriage F, and carriages G G, an up and down motion; this motion may be given by a crank or other power; R, the trigger that holds and moves the racks, out and in gear, from one rack to the other, so that carriage F, may go up while on one rack and down while on the other rack by which one spoke will be cut while the carriage F, is going up, and another spoke will be cut while carriage F, is coming down; r, is the dog that holds the pinion from going back. S, S, the levers to press against the hold fasts s, s, in order to hold the pattern and rough material fast in the carriages G, G. Any other kind of fastening may be used to hold the pattern and rough material. T, T, the cords attached to the carriages B, and C, t, t, the weights on one end of the cords T, T. The cutting tools and tracers being on the carriages B, and C, they are drawn toward and against the pattern and rough material, by the weights t, t. The tracers may be set farther out or in by the set screws u, u, so that the rough material may be cut larger or smaller in diameter on one or both sides than the pattern. Carriages G, G, can be disconnected in the center and by applying a crank, or any other power, to that part of carriage G, which holds the rough material, the rough material, will be made to travel to the right and left, faster or slower than the pattern; by this method the spoke will be cut longer or shorter than the pattern. Or it may be done by putting a crank motion to carriage F, and a rack and pinion motion to carriage G, and then place bands on pulleys v, v; pulleys v, v, are fastened on one end of screws w, w. Screws w, w, go through the slides W, W.

The arms x, x that the cutting tools are on, are supported or fastened on the slides W, W. By the slides moving to the right or left and carrying the cutting tools with them, the rough material will be cut longer or shorter than the pattern; longer when moved to the right and shorter when moved to the left.

In cutting boot-tree backs and fronts which must have one smooth surface so as to be matched by tongue and groove, I attain by the stationary pattern and rough block, a material point not produced in any machine where the pattern and block rotate viz: by cutting from top to bottom or vice versa, I do not work over the face of the pattern or rough material, keeping the edges sharp which is required when the fronts and backs are put together. By the use of the two cutting tools and tracers the work will be done quicker and will not require any follower to support the pattern and the rough material while being cut. The tools may be made in any shape. I do not claim any of the mechanical powers used, nor the cutting tools, nor the tracer, or friction points, nor the shape or form of the cutting tools, nor do I claim the pattern for a model or guide, as these have all been used before and are all common property, nor do I claim to be the first inventor to cut irregular forms to pattern, as this has been done before.

What I claim as my invention and desire to secure by Letters Patent is—

The combination and arrangement of the horizontal carriages G, G, working inside of, and moving vertically with the carriage F, and operating as herein described, for the purpose of making the pattern and rough material pass and repass the tracers and cutting tools or vice versa, when the same are used in combination with a pattern and rough block which do not revolve and are presented to and operated upon by said tracers and cutters as herein described and represented and for the purposes fully set forth.

JONATHAN RUSSELL.

In the presence of—
CHARLES D. FREEMAN,
ROBT. M. JONES.